April 13, 1943. P. M. MUELLER 2,316,180
MOLD
Filed June 5, 1941 9 Sheets-Sheet 1
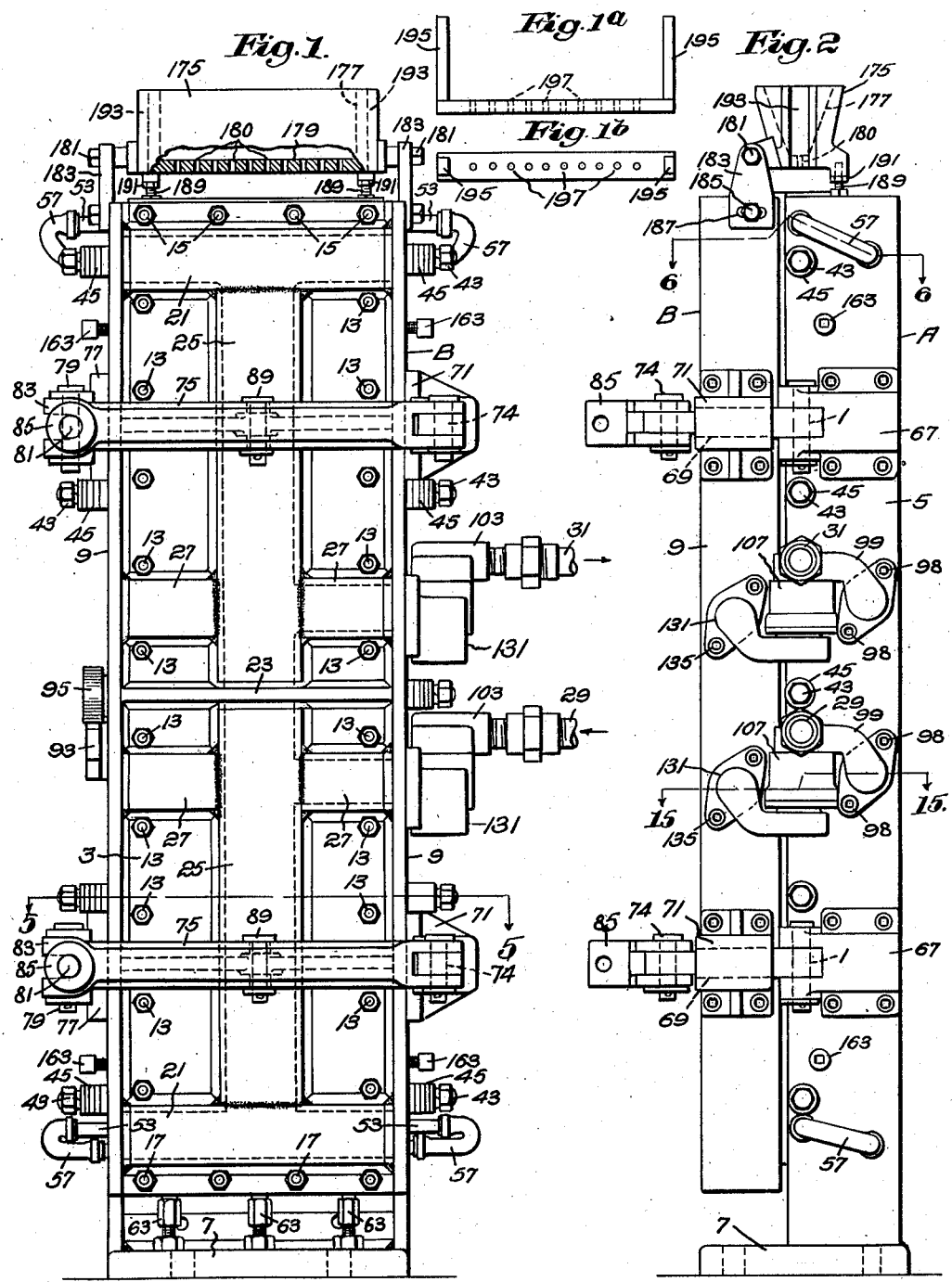

Inventor:
Paul M. Mueller

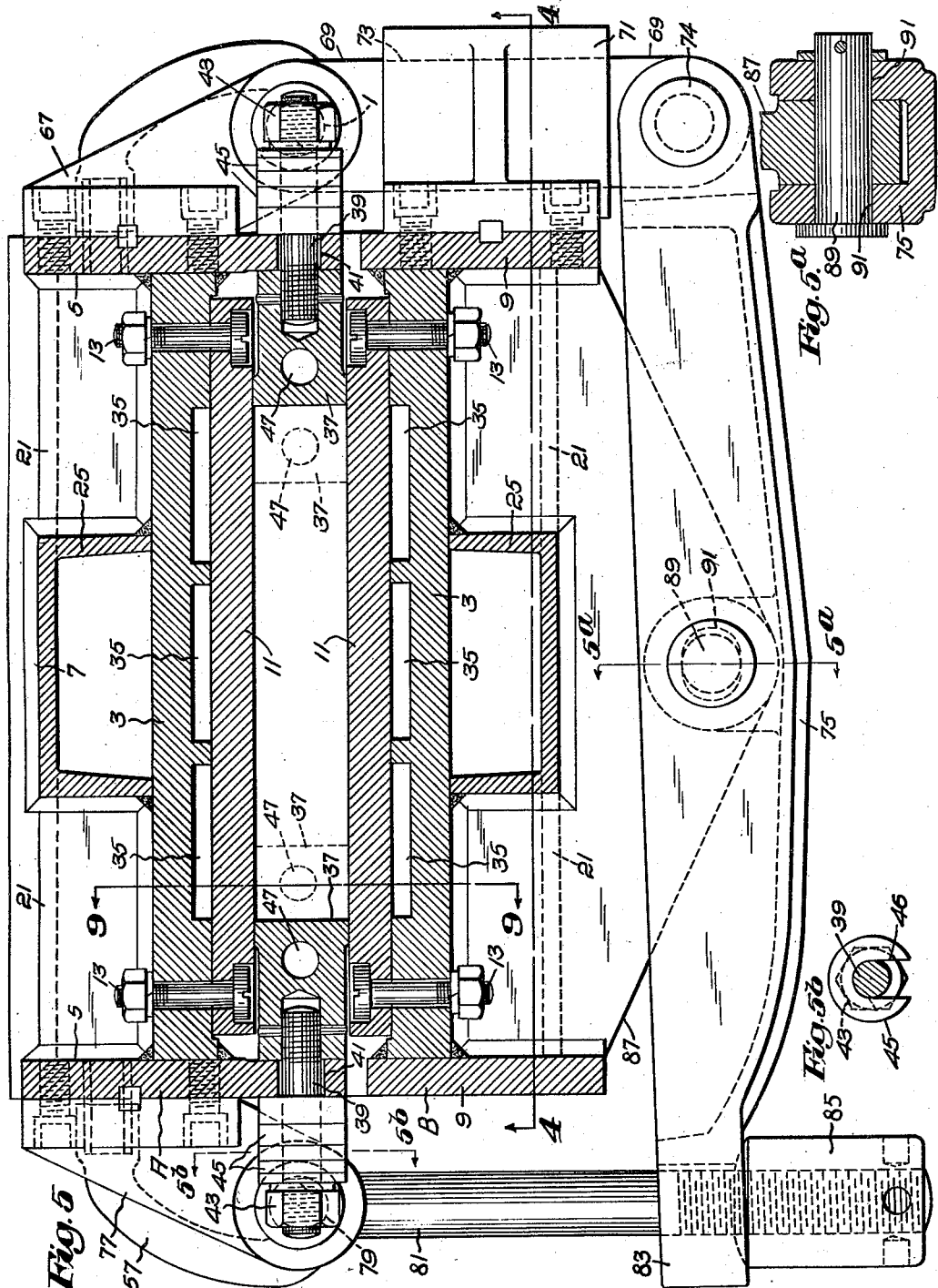

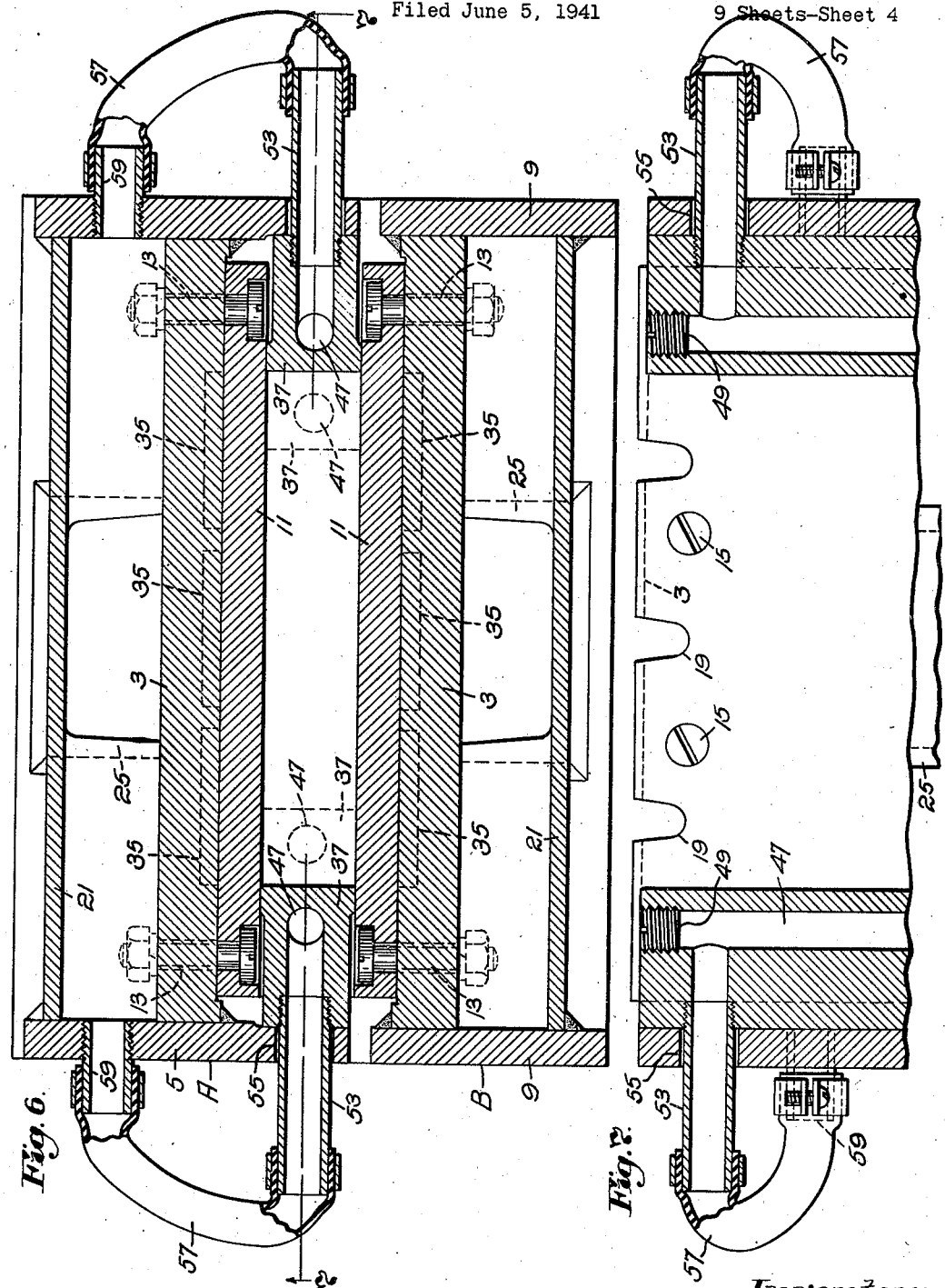

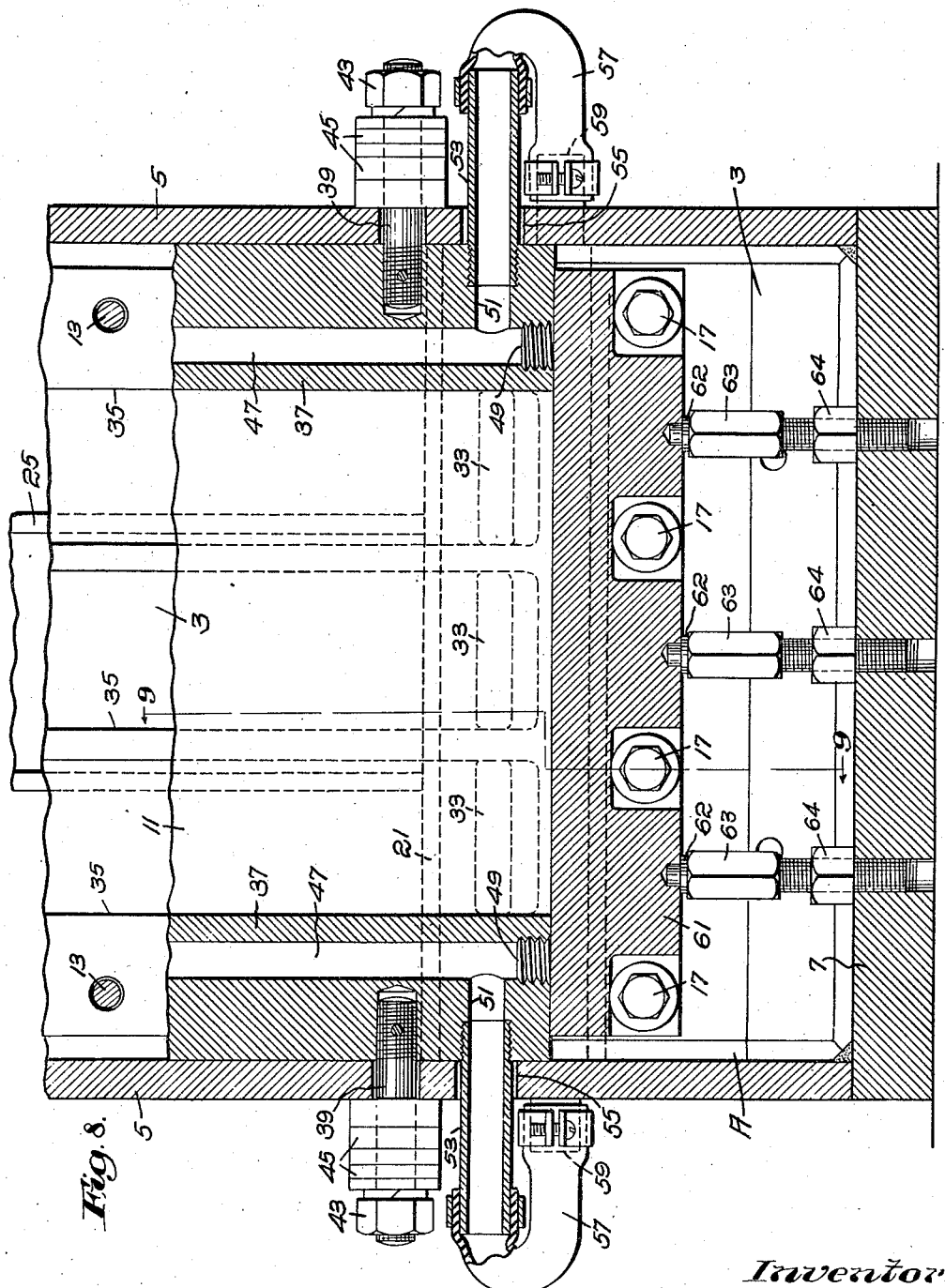

April 13, 1943.  P. M. MUELLER  2,316,180
MOLD
Filed June 5, 1941  9 Sheets-Sheet 6
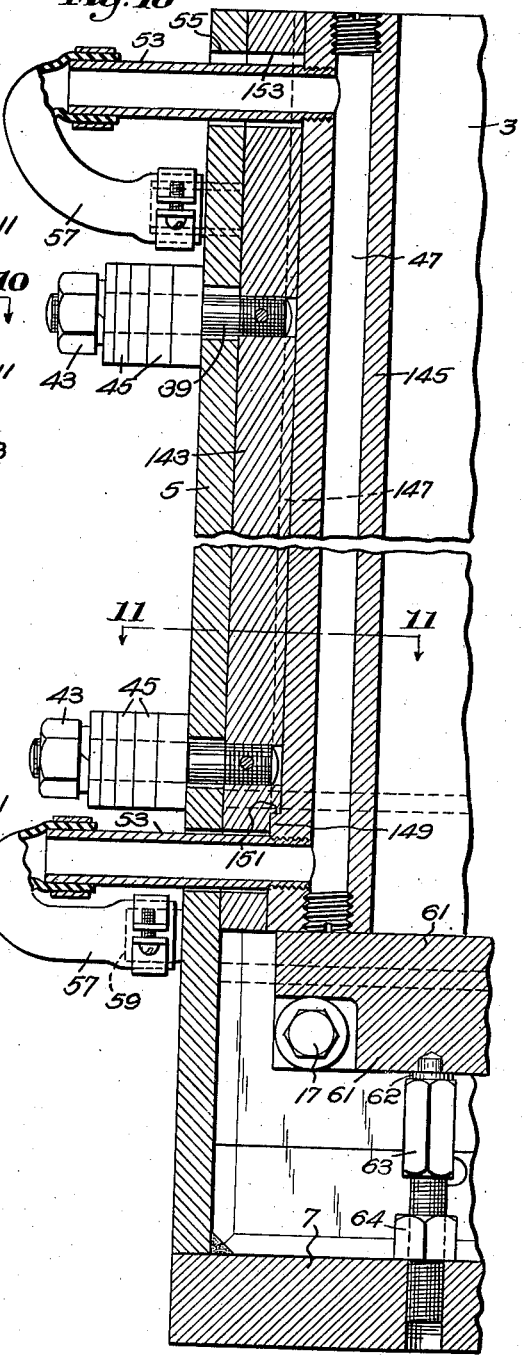
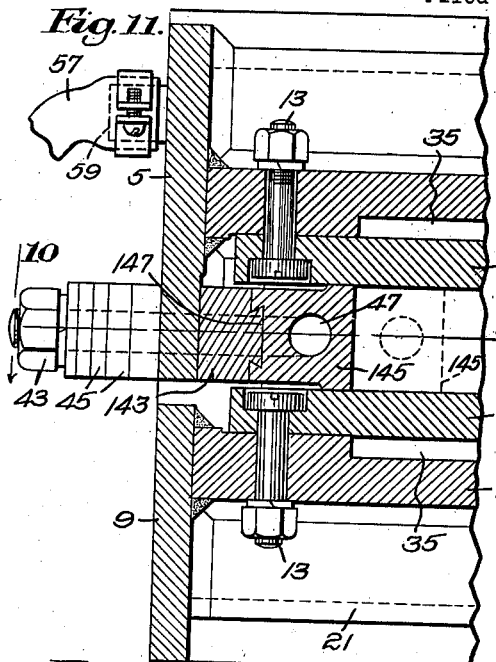
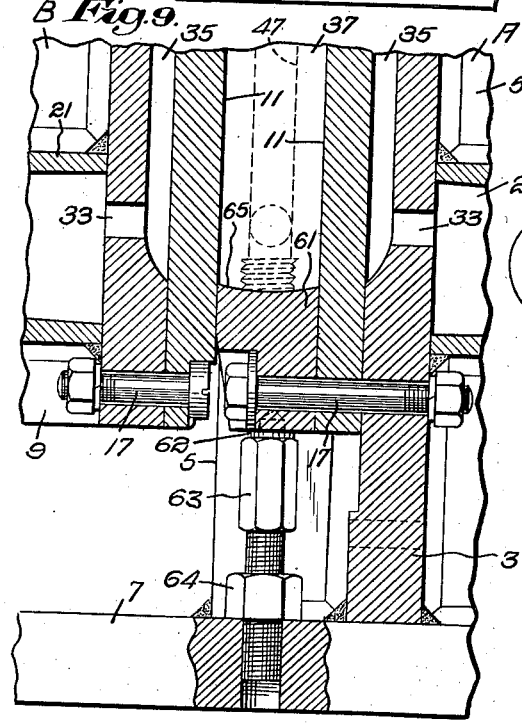
Inventor:
Paul M. Mueller,
by Emery Booth Townsend Miller & Weidner
Attys.

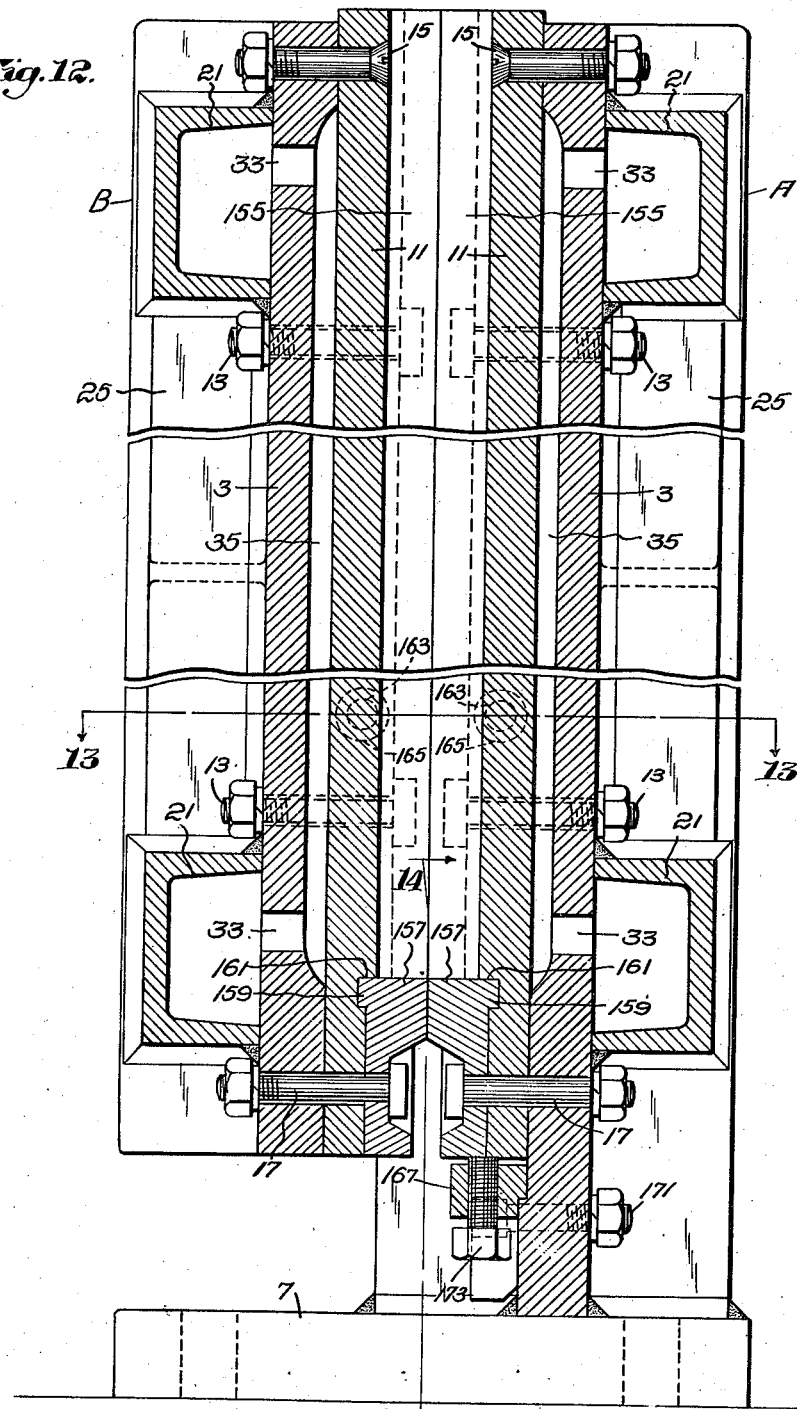

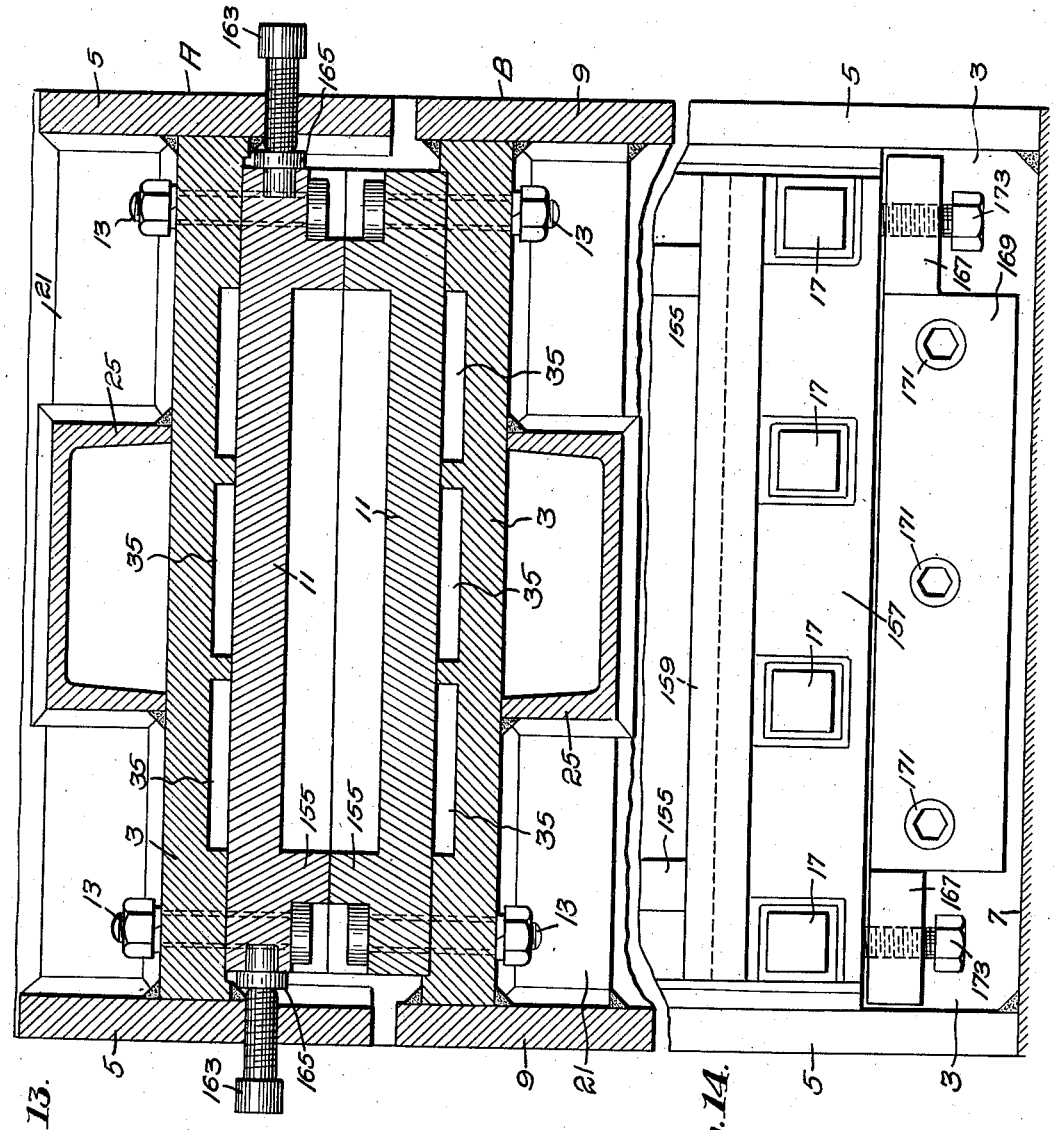

April 13, 1943.  P. M. MUELLER  2,316,180
MOLD
Filed June 5, 1941  9 Sheets-Sheet 9
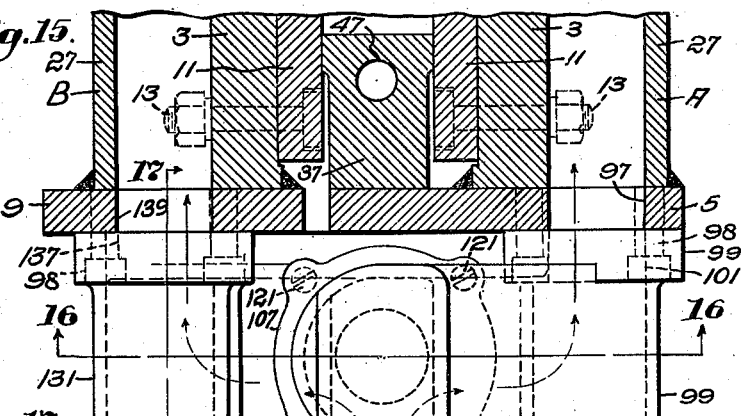
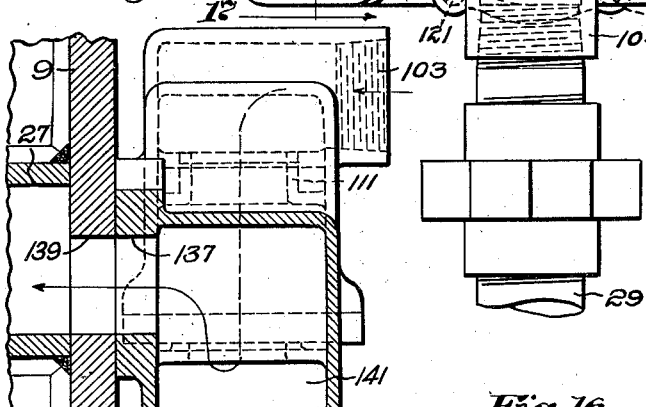
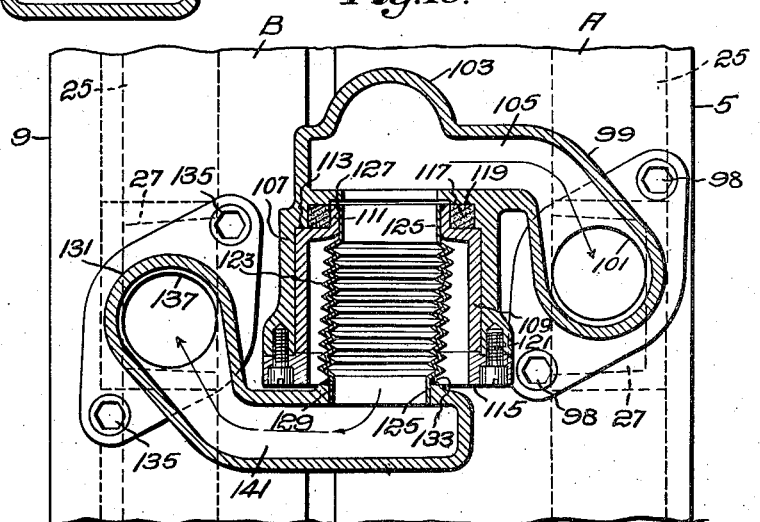
Inventor:
Paul M. Mueller,
by Emery Booth Townsend Miller & Weidner
Attys.

Patented Apr. 13, 1943

2,316,180

UNITED STATES PATENT OFFICE 2,316,180

MOLD

Paul M. Mueller, Rome, N. Y., assignor to Revere Copper and Brass Incorporated, Rome, N. Y., a corporation of Maryland Application June 5, 1941, Serial No. 396,696

25 Claims. (Cl. 22—144)

My invention relates to molds, particularly but not exclusively to those for casting elongated slabs of metal such as copper which are afterward reduced to sheets by rolling.

The invention will be best understood from the following description when read in the light of the accompanying drawings of several embodiments of the invention selected for illustrative purposes, the scope of the invention being more particularly pointed out in the appended claims.

In the drawings:

Fig. 1 is a side elevation of a mold according to the invention;

Fig. 1ª is an elevation of a jig used in conditioning the pouring box of Figs. 1, 2, 3 and 4;

Fig. 1ᵇ is a plan of the jig according to Fig. 1ª;

Fig. 2 is an end elevation of the mold according to Fig. 1 as viewed from the right;

Fig. 5 is a section on the line 5—5 of Fig. 1, with parts omitted;

Figure 3:
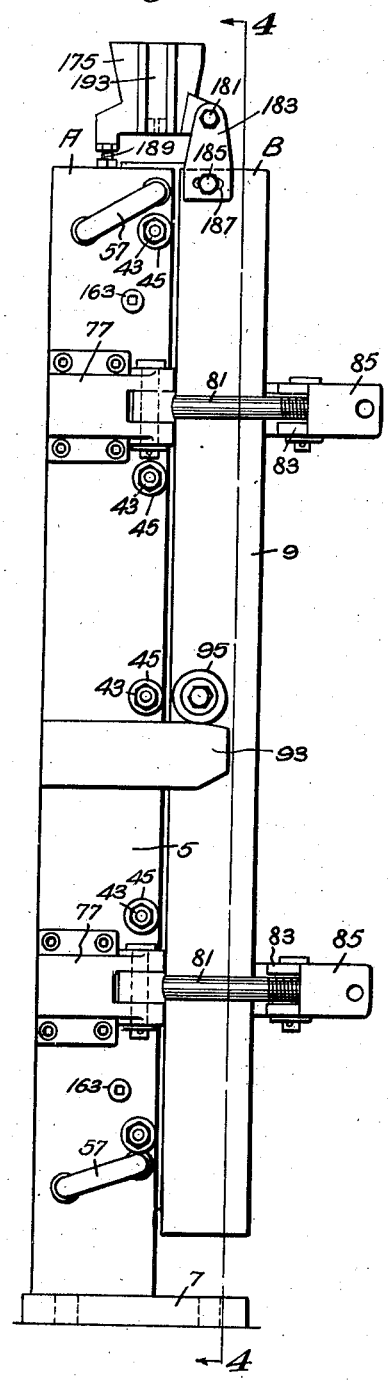
Fig. 3 is an end elevation of the mold according to Fig. 1 as viewed from the left.

Fig. 5ª is a fragmentary section on the line 5ª—5ª of Fig. 5, with parts omitted;

Fig. 5ᵇ is a section on the line 5ᵇ—5ᵇ of Fig. 5, showing a detail;

Fig. 6 is a section on the line 6—6 of Fig. 2, with parts omitted;

Fig. 7 is a section on the line 7—7 of Fig. 6, with parts omitted, showing the upper portion of the mold;

Fig. 8 is a section on the line 7—7 of Fig. 6, with parts omitted and parts broken away, showing the lower portion of the mold;

Fig. 9 is a section on the line 9—9 of Fig. 5, with parts omitted and parts broken away;

Fig. 10 is a section on the line 10—10 of Fig. 11, with parts omitted, showing a modified form of side bar, Fig. 10 otherwise corresponding to a section on the line 7—7 of Fig. 6;

Fig. 11 is a section on the line 11—11 of Fig. 10, with parts omitted;

Fig. 12 is a vertical transverse section showing a modified form of mold;

Figs. 13 and 14 are, respectively, sections on the lines 13—13 and 14—14 of Fig. 12;

Fig. 15 is a section on the line 15—15 of Fig. 2, with parts omitted; and

Figs. 16 and 17 are, respectively, sections on the lines 16—16 and 17—17 of Fig. 15.

The molds illustrated in the drawings are vertical molds which, without limitation thereto, are particularly useful for casting slabs of copper and its alloys.

Referring particularly to Figs. 1 to 9 of the drawings, the mold illustrated comprises a fixed mold part A and a complementary mold part B, the two being connected at one side for relative swinging about the axial line of the spaced vertically aligned pivot pins 1 (Figs. 1 and 2) and being adapted to be releasably clamped together in a manner hereinafter explained.

As illustrated (see particularly Figs. 1, 2 and 5), the mold part A comprises a vertical, longitudinally extending, plate-like member 3, hereinafter for convenience of terminology called a web. Integrally secured as, for example, by welding or casting, to each of the vertical edges of the web 3 is a vertical flange 5 projecting from opposite faces of the web so as to form a member which has approximately the shape of an I-beam in transverse cross-section. The web 3 and flanges 5 of the mold part A at their lower ends are shown integrally joined by welding or casting to a base 7 for supporting the mold and securing it to a suitable support.

The mold part B also comprises a vertical web 3, which in this case is integrally joined with edge flanges 9 to give the part B a cross-sectional shape approximating that of a channel-iron.

As illustrated, detachably secured to the inner face of the web 3 of each mold part A and B is a plate-like member 11 defining a face of the mold chamber. The members 11 are shown as secured to the webs 3 adjacent the edges of the latter by vertical rows of bolts 13, a horizontal row of bolts 15 at the top of the mold, and a horizontal row of bolts 17 at the bottom of the mold. These bolts, except the two bolts 15 shown (Figs. 1 and 7) at the middle portion of the row thereof, are all outside the mold chamber. These bolts 15 at the middle portion of the row however have countersunk flat heads, as shown in Fig. 12, so as to lie flush with the inner surfaces of the plates 11 defining the faces of the mold chamber. In pouring the metal it is intended that the pouring operation will be discontinued when the upper level of the metal is just below the bolts 15, so that any freezing of the metal which may occur in any cavities unavoidably caused by the presence of the countersunk bolts 15 will not interfere with the proper shrinking of the casting. To prevent the metal from accidentally pouring over the top of the mold, thus causing freezing at that point, the upper edges of at least one of the plates 11 and the corresponding web 3 are provided with over-flow grooves 19 (Fig. 7) which on account of their small cross-section will not interfere with proper shrinking of the casting if any metal freezes in these grooves.

Opposite the plates 11 each of the webs 3 adjacent its upper and lower end is provided with a transverse stiffening rib 21 (Figs. 1, 4 and 5), these ribs being integrally formed, by welding or otherwise, with the web 3 and edge flanges 5 or 9. As shown, the ribs 21 are in the form of channel irons, the flanges of which are integral with the web 3. At about the mid point of the length of each mold part A and B is a transverse partition rib 23 in the form of a plate integral with the web 3 and edge flanges 5 or 9, and extending between this rib 23 and the ribs 21 are vertical ribs 25 also in the form of channel-irons integrally joined to the web 3 and likewise to the rib 23 and ribs 21. The interior spaces of the channels formed by the ribs 21 and 25 are in communication, as clearly shown by Fig. 4, the rib 23 serving as a partition to divide the channel formed by the upper rib 25 from the lower rib 25. At opposite sides of the partition rib 23 and extending between the ribs 25 and the edge flanges 5 or 9 are transverse ribs 27 also in the form of channel-irons and integrally joined with the ribs 25, the webs 3, and edge flanges 5 or 9. Each of the ribs 27 at the right of the ribs 25, as viewed in Figs. 1 and 4, communicates with the adjacent rib 25. In a manner hereinafter explained, the lower ribs 27 at the right of the ribs 25, as viewed in Figs. 1 and 4, of each mold part communicate with a common inlet connection 29, carried by the mold part A, for water or other cooling medium, while the upper ribs 27 at the right of the ribs 25 communicate with a common outlet connection 31 carried by the mold part A.

Interiorly of the cooling medium passages afforded by the channel-shaped ribs 21, each web 3 is provided with perforations 33 (Figs. 4 and 9) which communicate with vertical longitudinal grooves 35 formed on the face of the web 3 adjacent the plate 11. These grooves are closed by the plates 11 and provide channels for the cooling medium. The water or other cooling medium from the inlet connection 29, as clearly indicated by the arrows in Fig. 4, enters the passages formed by the adjacent right hand rib 27 and flows downwardly through the communicating channel formed by the lower rib 25 and enters the channel formed by the lower rib 21. From this latter channel it is distributed by the adjacent perforations 33 to the channels 35, and flowing upwardly through these channels discharges through the upper perforations 33 into the channel formed by the upper rib 21, whence it flows downwardly through the upper rib 25 and from there through the communicating channel formed by the upper rib 27 at the right of this rib 25 to the outlet or discharge connection 31. In this way the plates 11, which preferably are formed of good conducting material such as copper, are effectively cooled. The approximate I-beam and channel-iron constructions of the body portions of the mold parts A and B in conjunction with their stiffening ribs form very rigid supports for the plates 11, which latter are permitted to expand and contract by reason of the clearance in the bolt holes for the bolts securing the plates to the webs 3, yet without warping on account of the rigidity of the stiffened webs 3 against which the plates are tightly held by the clamping means hereinafter described.

In the construction illustrated by Figs. 1 to 9 bars 37 defining the sides of the mold chamber are detachably secured to the edge flanges 5. As shown, these bars are provided with studs 39 (Figs. 1 and 5) projecting through perforations 41 in the adjacent edge flanges 5, and are rigidly clamped to the bars by nuts 43 carried by the studs. As illustrated in Fig. 5, a series of washers 45 of different thickness are placed between the nuts 43 and the adjacent side of each flange 5. One or more of these washers, or all of them, may be placed at the opposite side of the flange so as to lie between the flange and the adjacent bar 37, and by so positioning them the width of the mold chamber may be varied say, for example, by moving either or both bars 37 to their dotted line positions shown in Fig. 5. So that the washers 45 may be readily removed and replaced without the necessity of detaching the side bars from the edge flanges 5, the washers are preferably formed with radial slots 46 of width the diameters of the studs 39, which slots open into the stud receiving bores of the washers to give the latter a U-shape as shown in Fig. 5b. This construction provides a rigid support for the side bars 37, the bars being permitted to expand and contract longitudinally by reason of the clearance between the stud bolts 39 and the walls of the perforations 41, yet the bars are strongly held against the flanges 5 by the nut 43 and are strongly clamped between the plates 11 to prevent warping of the bars.

As shown, the side bars 37 are provided adjacent their surfaces defining the sides of the mold chamber with longitudinal bores 47 for the cooling medium, which construction acts to keep the bars cool and to prevent transfer of heat to the flanges 5 so that the latter will not tend to warp. As shown in Figs. 7 and 8, the upper and lower ends of the bores 47 are closed by plugs 49, and are provided with lateral bores 51 communicating with short lengths of pipe 53. These pipes slidably extend through perforations 55 in the flanges 5 so that the side bars may be adjusted by use of the washers 45 on the studs 39 in the manner hereinbefore explained, the upper perforations at least having considerable clearance with the pipes to permit the bars freely to expand and contract longitudinally. To the outer ends of the pipes 53 are secured short lengths of flexible hose 57 leading to pipe nipples 59 carried by the edge flanges 5. These nipples place the hose in communication with the channels formed by the adjacent upper and lower channel-shaped ribs 21, as shown in Fig. 6, so that the cooling medium from the inlet connection 29 may enter the lower ends of the bores 47 and flow upwardly and discharge from the upper ends of the bores 47 and be carried off by the outlet connection 31 for the cooling medium.

As illustrated in Figs. 8 and 9, the bottom of the mold chamber is defined by the upper surface of a bar 61 carried by the mold part A. This bar, which preferably is of cast iron, is secured against the adjacent side of the plate 11 of the mold part A by the bolts 17 which secure that plate to the adjacent web 3. The bar 61 is of such length as to extend under the opposite side bars 37, and is adapted to be strongly forced against the lower ends of the latter by screw jacks 63, which jacks are adjustably screwed into the base 7 of the mold part A and have lock nuts 64 to prevent them from accidentally backing off. The clearance about the bolt holes for the bolts 17 permits sufficient movement of the bar 61 to permit it to be so forced by the jacks 63, and permits longitudinal expansion and contraction of the bar, yet the jacks 63 prevent warping of the bar, and, by forcing them against the lower ends of the side bars 37, insures against entrance of metal between the upper face of the bar 61 and the ends of the side bars. As shown by Fig. 9, the upper face 65 of the bottom bar 61 is slightly concave transversely thereof, and the ends of the side bars are similarly shaped to conform therewith. By so concaving the bottom bar the casting is prevented from accidentally slipping out of the mold when the mold is opened. Conveniently the bar 61 carries projecting buttons 62 cooperating with the upper ends of the jacks 63, making it unnecessary to finish the adjacent side of the bar.

Figure 4:
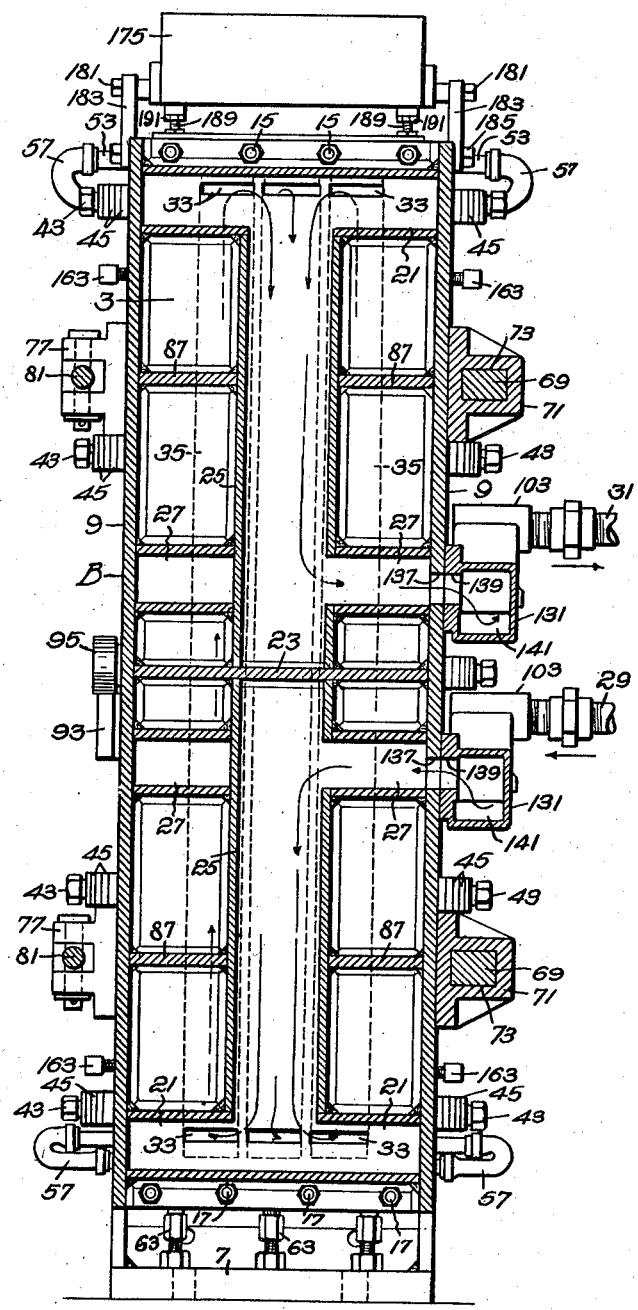
Fig. 4 is a section on the line 4—4 of Fig. 3, the line 4—4 also being placed on Fig. 5 for convenience in following the drawings.

The means for pivotally supporting the mold parts A and B is best shown by Figs. 1 to 5. As illustrated, to one of the flanges 5 of the mold part A are rigidly secured spaced brackets 67 which carry the vertically positioned pivot pins 1 hereinbefore referred to. These pins serve pivotally to secure to the ends of the brackets links 69 shown as of rectangular cross-section (Fig. 4). Rigidly secured to the flange 9 of the mold part B adjacent the links 69 are blocks 71 having perforations 73 through which the links slidably extend and in which they fit. At the outer ends of the links are pins 74 which pivotally secure thereto yoke bars 75 extending across the mold part B to the opposite side of the mold. To the edge flange 5 of the mold part A at that side are secured spaced brackets 77 to the outer ends of which at 79 are pivotally secured the ends of links 81, the latter removably extending through the openings formed by the bifurcated adjacent ends 83 of the yoke bars 75 and adjustably carrying nuts 85 resting against the outer surfaces of the yoke bars at those ends so that the yoke bars may be forcibly drawn toward the mold part A to clamp the mold part B between it and the yoke bars.

As shown, the mold part B is provided with a plate 87 beneath each yoke bar, the plate being notched to permit the ribs 25 to pass through it and fitting the exterior of those ribs at the outer surface of the web 3 and adjacent parts of the edge flanges 9 and being welded thereto or being otherwise integrally formed with the body of the mold part B. As illustrated (see Fig. 5a), the intermediate portion of each yoke bar is channel-shaped in cross-section, the adjacent plate 87 fitting within this channel and being pivoted to the yoke bar by a pin 89, the aligned holes 91 in the yoke bars for receiving the pins being elongated in the direction of the lengths of the yoke bars, as shown in Fig. 5, so that the mold part B may move longitudinally of those bars.

The combined structure for pivotally securing the mold part B to the mold part A and for clamping the two together permits the mold part B to adjust itself toward the mold part A and transversely thereof, while forcing the mold part B to swing around the aligned axes of the pivot pins 1. This permits slight variations in the thickness of the side bars 37 and bottom bar 61 so that the thickness of the casting may be varied, and permits the surfaces of the plates 11 defining the faces of the mold chamber to be finished from time to time and takes care of discrepancies in manufacture of the parts.

As illustrated (see Figs. 1, 3 and 4), the outer side of the edge flange 5 of the mold part A opposite the flange 5 thereof which carries the aligned pivot pins 1 carries a bar which provides a lug 93 projecting toward the mold part B. The adjacent edge flange 9 of the mold part B carries a roller 95 adapted to ride on the upper surface of the lug 93. In this way the mold part B is brought into proper position in a vertical direction with the mold part A to take care of wear and discrepancies in manufacture in the hinged support for the mold part B. The lug 93, as clearly shown in Fig. 4, has a slight clearance with the adjacent web flange 5 of the mold part B, and this clearance and the sliding contact of the plate 11 of the mold part B with the side bars 37 permit any slight transverse sliding of the mold part B relative to the mold part A necessary to bring the two properly together.

The connections for supplying and discharging the cooling medium are best illustrated by Figs. 1, 2, 15, 16 and 17. As each is like the other, a description of the inlet connection will therefore suffice.

As shown, the edge flange 5 of the mold part A is provided with an opening 97 in communication with the passage afforded by the adjacent hollow rib 27. Detachably secured to the outer side of the edge flange 5 by bolts or screws 98 is a hollow casting 99 having an opening 101 communicating with the opening 97. The inlet connection 29 is connected to a hollow boss 103 forming part of the casting 99. Establishing communication between the interior of the boss 103 and the opening 101 of the casting 99 is a passage 105 so that the cooling medium may flow from the inlet connection 29 through the boss 103 and passage 105 into the passage afforded by the hollow rib 27, it being understood that in the case of the outlet connection the cooling medium flows in the opposite direction from the passage afforded by the hollow rib 27 to the outlet connection 31 connected to the boss 103.

The casting 99 is further provided with a sleeve portion 107 projecting downwardly from the boss 103, and swivelled interiorly of this sleeve for rotation about an axis in alignment with the axes of the pivot pins 1 is a second sleeve 109. As shown, the sleeve 109 has a portion 111 of reduced cross-section at its inner end to form a shoulder 113 bearing against the bottom of the socket afforded by the sleeve 107. Carried by the outer end face of the sleeve 103 is detachably secured a ring member 115 engaging the outer face of the sleeve 109 for retaining the latter against longitudinal movement relative to the sleeve 107. In the space between the sleeve 107 and the reduced diameter portion 111 of the sleeve 109 is a compressible ring packing member 117 of any suitable construction, this packing being compressed against the wall 119 of the casting 99 when the ring 115 is drawn by the screws 121 against the sleeve 109 to force the latter inwardly against the packing.

Interiorly of the sleeve 109 is shown a metal bellows 123 having a neck portion 125 received in the bore of the erduced diameter portion 111 of the sleeve 109 and welded thereto as at 127. The lower end of the bellows is provided with a similar neck 125, which neck is received in an opening 129 in a second hollow casting 131, this neck of the bellows being welded to the casting as shown at 133.

The casting 131 is detachably secured by bolts or screws 135 to the outer end of the web flange 9 of the mold part B opposite the flange 5 to which the casting 99 is secured, and is provided with an opening 137 in fluid communication with an opening 139 in the flange 9 communicating with the interior of the adjacent hollow rib 27. The casting 131 has a portion, formed with a passage 141, projecting over the lower open end of the sleeve 109, into which passage the lower end of the bellows 123 opens. By so connecting the mold part B with the casting 99 the cooling medium from the inlet connection 29 can flow from the hollow boss 103 through the bellows and into the passage 141 in communication with the cooling medium distributing conduits of the mold part B, and can flow from those conduits in the opposite direction to the outlet connection 31.

The bellows 123 in the above described construction is extensible and contractible longitudinally to permit the mold part B to move vertically relative to the mold part A, and is laterally yieldable to permit the mold part B to be positioned closer to or farther from the mold part A. The construction of the bellows however is such that it resists torsional strains, and causes the sleeve 109 freely to rotate on its bearings when the mold is opened and closed. It will be observed that the sleeves 107 and 109 house the bellows to prevent it from being injured accidentally, and that the casting 131 extends over the opening of this housing further to protect the bellows from injury.

In Figs. 10 and 11 is illustrated a modified form of side bar construction, the construction of the mold being otherwise the same as shown in Figs. 1 to 9. The side bars of Figs. 10 and 11 are made of two parts 143 and 145 which are relatively slidable longitudinally, being connected by a dove-tail slot and groove 147. As shown, the part 143 carries the studs 39 hereinbefore referred to, the studs being adapted to clamp that part to the adjacent edge flange 5 of the mold part A. At its lower end the part 145 has an offset portion 149 fitting into a recessed end of the part 143. The recess of the part 143 forms at its upper end a shoulder 151 between which and the bottom bar 61 the offset portion of the part is clamped by the jack screws 63. By this construction the lower end of the part 145 in contact with the molten metal is fixed against movement, while the portions thereof above it are free to slide vertically because of the dove-tail connection between the parts 145 and 143. The short pipe connections 53 for conducting water to and from the bores 47 are screwed into the parts 145 and extend through perforations 153 in the part 143 as well as the perforations 55 in the edge flanges 5. Otherwise the construction in respect to the side bars is the same as that hereinbefore described.

If desired, the bars defining the side of the mold chamber may be integral with the plates 11, and, if desired, these bars, as well as the bars defining the bottom of the mold chamber, may be split along the vertical medial plane of the mold. Such a construction is illustrated in Figs. 12, 13 and 14, in which the plates 11 are integrally formed with complementary vertical flanges 155 defining the sides of the mold chamber and at their lower ends carry complementary horizontal bars 157 defining the bottom of the mold chamber.

The bottom bars 157 of Figs. 12, 13 and 14, as shown, are provided at their upper portions with laterally projecting ribs 159 fitting grooves 161 extending entirely across the plates 11 below the vertical flanges 155, the upper surfaces of which bars the lower ends of the vertical flanges abut. As shown, the horizontal bars 157 are secured to the plates 11 and webs 3 by the lower row of bolts 17, the plates 11 being otherwise secured to the webs 3 as hereinbefore described.

In the construction shown by Figs. 12, 13 and 14, to bring the complementary vertical flanges 155 and the complementary horizontal bars 157 into alignment the plate 11 carried by the mold part A is adjustable relative to the web 3 thereof vertically and horizontally, such slight adjustment as is necessary being afforded by the clearance between the bolts and the bolt holes securing the plate to the web of the mold part A.

As shown, for effecting the horizontal or lateral adjustment of the plate 11 of Figs. 12, 13 and 14, the edge flanges 5 of the mold part A have threaded through them key-operated screw jacks 163 (Figs. 1 and 13), the inner ends of the jacks bearing against hardened buttons 165 inserted in the copper body of which the plate 11 is formed. By adjusting these jacks the plate 11 carried by the mold part A may be adjusted laterally. For adjusting the plate 11 carried by the mold part A vertically the web 3 of that part carries beneath the plate and the adjacent bar 157 a pair of brackets 167 formed integrally with a plate 169 rigidly secured by bolts 171 to the web 3. These brackets screw-threadedly carry jack screws 173 the upper ends of which, as shown, bear against the lower surface of the bottom bar 157 and plate 11. The bottom bar 157, being of cast iron, makes it unnecessary to have the wearing buttons 165 (Fig. 13) at this point.

Otherwise the construction shown by Figs. 12, 13 and 14 is the same as that shown by Figs. 1 to 9, and the parts forming the mold chamber of Figs. 12, 13 and 14 may be substituted for those of the mold shown by Figs. 1 to 9.

As shown in Figs. 1 to 4, above the mold chamber is positioned an open top pouring box 175. This box has a funnel-shaped interior 177, the bottom 179 being formed with a row of perforations 180 positioned above the mold chamber. The pouring box is pivotally attached by removable pivot bolts 181 to brackets 183, the brackets being carried by the edge flanges 9 of the mold part B. These brackets, as shown, are removably secured to the flanges 9 by bolts 185 passing through slots 187 in the brackets so that the latter together with the pouring box may be adjusted laterally of the mold chamber. For adjusting the pouring box about its pivotal support, it has adjustably screw-threaded into it downwardly projecting posts 189 provided with lock nuts 191, the lower ends of the posts resting on the top of the edge flanges 5 of the mold part A. As shown, the mold box at opposite ends is provided with exterior, accurately machined grooves 193 for receiving the legs 195 (Fig. 1a) of a U-shaped jig, the body of which jig is formed with a row of perforations 197 for properly guiding a drill for clearing the perforations 180 of the pouring box when they become clogged with frozen metal. The jig may be applied to the exterior bottom surface of the pouring box upon removal of the same from the mold part B, or by swinging the box into upside-down position on its pivotal support. By pouring the metal into the mold chamber in thin separated vertical streams caused by the perforations 180, which latter in practice may be about ¼ inch in diameter and spaced about one inch apart, and accurately positioning the pouring box with reference to the mold chamber, the metal stream does not strike the sides of the mold chamber while being poured, and assurance is had that air or other gas will not be trapped in the metal.

The invention as relates to mounting the mold parts for relative movement for opening and closing the mold chamber and for clamping said parts together, described herein, forms the subject matter of a divisional application Serial Number 446,722, filed by applicant June 12, 1942, while the invention as relates to the connection for cooling medium between the relatively swinging mold parts, described herein, forms the subject matter of a divisional application Serial Number 446,723, filed by applicant June 12, 1942.

It will be understood that, within the scope of the appended claims, wide deviations may be made from the forms of the invention described without departing from its spirit.

I claim:

1. A mold for casting elongated metal slabs having means forming a vertical mold chamber comprising separable complementary mold parts, one of which parts comprises an elongated web provided with opposite edge flanges which flanges extend throughout the length of the mold chamber in facing relation to the sides of said chamber so that the latter lies between said flanges, an elongated plate-like member between said edge flanges defining a face of the mold chamber, which plate-like member is detachably secured at its edges to said web, elongated bar-like members defining the sides of the mold chamber, which members are positioned against the vertical edge portions of said plate-like member, means for detachably securing said members along their lengths operatively against the adjacent sides of said edge flanges, the other mold part defining the opposite face of the mold chamber and being adapted to be positioned against those sides of said bar-like members which are opposite the sides thereof positioned against said plate-like member, and means for clamping said plate-like member and bar-like members between said web and last mentioned mold part.

2. A mold according to claim 1 in which the side of the web adjacent the plate-like member is so formed as to provide open side channels for cooling medium, which open sides of said channels are closed by said plate-like member.

3. A mold according to claim 1 in which the side of the web adjacent the plate-like member is so formed as to provide open sided channels for cooling medium, which open sides of said channels are closed by said plate-like member, the web at the side thereof opposite said channels being integrally formed with stiffening ribs having cooling medium distributing passages for said channels.

4. A mold according to claim 1 having a bar-like member defining the bottom of the mold chamber, which bar-like member is positioned against the ends of the bar-like members defining the sides of the mold chamber and against a side of said plate-like member, the means for clamping the plate-like member and last mentioned bar-like members between the web and last mentioned mold part of claim 1 also clamping said bar-like member defining the bottom of the mold chamber between them.

5. A mold according to claim 1 having a bar-like member defining the bottom of the mold chamber, which bar-like member is positioned against the ends of the bar-like members defining the sides of the mold chamber and against said plate-like member, the means for clamping the plate-like member and last mentioned bar-like members between the web and last mentioned mold part of claim 1 also clamping said bar-like member defining the bottom of the mold chamber between them, and means for forcing said bar-like member defining the bottom of the mold chamber against the lower ends of the other bar-like members.

6. A mold for casting elongated metal slabs having means forming a vertical mold chamber having a closed bottom and open top comprising separable parts defining the opposite faces of the mold chamber, bar-like members defining the sides of the mold chamber, a third bar-like member contacting with the lower ends of the first mentioned bar-like members to define the bottom of the mold chamber, all of which members are adapted to be clamped between said parts, and means supporting said first mentioned bar-like members for sliding longitudinally relative to said parts, while securing the lower ends thereof against such sliding to maintain said ends in contact with said third bar-like member.

7. A mold according to claim 1 in which is provided a third bar-like member in contact with the lower ends of the other bar-like members for defining the bottom of the mold chamber, and in which said other bar-like members are operatively fixed at their lower ends against movement relative to said edge flanges, and above said lower ends are mounted for longitudinal sliding relative to said flanges.

8. A mold for casting elongated metal slabs having means forming a vertical mold chamber comprising separable complementary mold parts, one of which parts comprises an elongated web provided with opposite edge flanges, an elongated plate-like member between said edge flanges defining a face of the mold chamber, which plate-like member is detachably secured at its edges to said web, elongated vertical bar-like members defining the sides of the mold chamber, which bar-like members are positioned against said plate-like member, means adjacent the lower ends of said bar-like members operatively forming a fixed downwardly facing shoulder on each of said edge flanges and an abutting upwardly facing shoulder on the adjacent bar-like members, a horizontal bar-like member defining the bottom of the mold chamber abutting the lower ends of said vertical bar-like members, means acting on said horizontal bar-like member for forcing said shoulders into contact, and means for supporting said vertical bar-like members on said edge flanges above said shoulders for vertical sliding.

9. A mold according to claim 1 in which the means for detachably securing the bar-like members along their lengths against the adjacent sides of the edge flanges has provision for adjustably positioning one of said bar-like members relative to the edge flanges for varying the width of the slab cast.

10. A mold according to claim 1 in which the means for detachably securing the bar-like members along their lengths against the adjacent sides of the edge flanges has provision for adjustably positioning one of said bar-like members relative to the edge flanges for varying the width of the slab cast, which means to such end comprises studs operatively carried by said bar-like member and openings in the adjacent edge flange, through which openings said studs extend, nuts on the free ends of said studs, and removable spacers adapted to be placed at either side of said flange between the latter and either said bar-like member or nuts.

11. A mold according to claim 1 in which the means for detachably securing the bar-like members along their lengths against the adjacent sides of the edge flanges has provision for adjustably positioning one of said bar-like members relative to the edge flanges for varying the width of the slab cast, said bar-like member having a longitudinally extending passage for cooling medium, and a flexible hose connection to said passage permitting such adjustment of said member.

12. A mold according to claim 1 in which one of the separable complementary mold parts has passages formed therein for cooling medium for cooling the web and plate-like member, the bar-like members having longitudinally extending passages for cooling medium, and fluid connections between the first and second mentioned passages.

13. A mold according to claim 1 in which the edge flanges extend from opposite faces of the web to form an I-beam shape, the side of the web adjacent the plate-like member being grooved to provide channels for cooling medium, which channels are closed by said plate-like member, the web at the side thereof opposite said plate-like member having stiffening ribs integral with said web and the edge flanges at that side, passages in said ribs, and perforations in said web connecting said passages to said channels.

14. A mold according to claim 1 in which the edge flanges extend from opposite faces of the web to form an I-beam shape, the side of the web adjacent the plate-like member being so formed as to provide open sided channels for cooling medium, which open sides of said channels are closed by said plate-like member, the web at the side thereof opposite said plate-like member having stiffening ribs integral with said web and the edge flanges at that side, passages in said ribs, perforations in said web connecting said passages to said channels, said bar-like members having longitudinally extending bores for cooling medium, and fluid connections between said bores and passages.

15. A mold for casting elongated metal slabs having means forming a vertical mold chamber comprising separable complementary mold parts, one or when parts comprises an elongated plate-like web, a plate-like member defining a face of the mold chamber secured at its edge portions to said web at one side of the latter, bar-like members defining the sides of the mold chamber positioned against said plate-like member and operatively secured to said web, said web being grooved at its side adjacent said plate-like member to form channels for cooling medium, which channels are closed by said plate-like member, stiffening ribs at the opposite side of said web, which ribs are formed with passages for cooling medium, and openings in said web placing said passages in fluid communication with said channels.

16. A mold according to claim 15 in which the bar-like members defining the sides of the mold chamber are provided with longitudinally extending bores for cooling medium, and fluid connections between said bores and the passages formed in the stiffening ribs for the web.

17. A mold for casting elongated metal slabs having means forming a vertical mold chamber with a closed bottom comprising a pair of body portions hingedly connected together, one of said body portions comprising a plate-like web having detachably secured thereto a plate-like member defining a face of the mold chamber, vertical bar-like members operatively secured to said web for defining the sides of the mold chamber, a horizontal bar-like member for defining the bottom of the mold chamber positioned against said plate-like member and against the lower ends of said vertical bar-like members and secured to said web, and means for forcing said horizontal bar-like member upwardly against the ends of said vertical bar-like members.

18. A mold for casting elongated metal slabs having means forming a vertical mold chamber with a closed bottom comprising a pair of body portions hingedly connected together, one of said body portions comprising a web having detachably secured thereto a plate-like member defining a face of the mold chamber, a horizontal bar-like member for defining the bottom of the mold chamber positioned against said plate-like member and secured to said web, which bar-like member has a longitudinally extending rib received in a transversely extending groove in said plate-like member.

19. A mold for casting elongated metal slabs having means forming a vertical mold chamber comprising separable mold parts, one of which parts comprises a support having an elongated web provided with stiffening members, a plate-like member defining a face of the mold chamber positioned against said web and detachably secured thereto at its edge portions, said web at the side thereof adjacent said plate-like member being so formed as to provide open sided channels for cooling medium, which open sides of said channels are closed by said plate-like member, and means for clamping said plate-like member between said web and the other of said mold parts.

20. A mold according to claim 1 in which the means for detachably securing the bar-like members along their lengths operatively against the adjacent sides of the edge flanges comprises a plurality of studs carried by said members distributed lengthwise thereof, said studs extending through the adjacent edge flanges to the sides thereof opposite said members, and nuts carried by said studs at the last mentioned sides of said flanges for drawing said members toward said flanges.

21. A mold according to claim 1 in which the means for detachably securing the bar-like members along their lengths operatively against the adjacent sides of the edge flanges comprises parts operatively forming interlocking tongue and groove connections between said flanges and members permitting vertical sliding of the members relative to the flanges while preventing substantial buckling of said members.

22. A mold according to claim 1 in which the means for detachably securing the bar-like members along their lengths operatively against the adjacent sides of the edge flanges comprises a plurality of studs carried by said members distributed lengthwise thereof, said studs extending through perforations in the adjacent edge flanges to the sides thereof opposite said members, and nuts carried by said studs at the last mentioned sides of said flanges for drawing said members toward said flanges, said perforations in said flanges being so formed as to permit vertical sliding of said members relative to said flanges.

23. A split mold comprising separable parts and having a side bar defining a vertical side of a closed bottom elongated vertical mold chamber, means securing said bar to one of the separable mold parts operatively comprising a vertically extending dovetailed tongue and groove connection between that part and said bar for permitting said bar to slide vertically relative to said part while preventing substantial buckling of said bar.

24. A split mold comprising separable parts and having a side bar defining a vertical side of a closed bottom elongated vertical mold chamber, means securing said bar to one of the separable mold parts operatively comprising a vertically extending dovetailed tongue and groove connection between that part and said bar for permitting said bar to slide vertically relative to said part while preventing substantial buckling of said bar, and means for securing one end of said bar against vertical sliding relative to said mold part.

25. A split mold comprising separable parts and having a side bar defining a vertical side of a closed bottom elongated vertical mold chamber, means securing one end portion of said bar to one of the separable mold parts against vertical sliding relative to that part while permitting the remaining portions of said bar to slide vertically relative to said part, said means being operative to resist buckling of said bar toward the mold chamber.

PAUL M. MUELLER.

CERTIFICATE OF CORRECTION.

Patent No. 2,316,180.                                April 13, 1943.

PAUL M. MUELLER.

It is hereby certified that error appears in the printed specification of the above numbered patent requiring correction as follows: Page 5, first column, line 48, claim 2, for "side" read --sided--; page 6, first column, line 50, claim 15, for "or when" read --of which--; and that the said Letters Patent should be read with this correction therein that the same may conform to the record of the case in the Patent Office.

Signed and sealed this 1st day of June, A. D. 1943.

Henry Van Arsdale,
Acting Commissioner of Patents.

(Seal)